United States Patent [19]

von Kaler

[11] 4,086,826

[45] May 2, 1978

[54] DIFFERENTIAL AXLE

[75] Inventor: Roland L. von Kaler, Tecumseh, Mich.

[73] Assignee: Tecumseh Products Company, Tecumseh, Mich.

[21] Appl. No.: 747,914

[22] Filed: Dec. 6, 1976

[51] Int. Cl.$^2$ ............................................. F16H 1/40
[52] U.S. Cl. .................................... 74/713; 74/607
[58] Field of Search ................................ 74/710, 713

[56] References Cited

U.S. PATENT DOCUMENTS

| | | | |
|---|---|---|---|
| 677,401 | 7/1901 | Dooley | 74/713 |
| 1,632,787 | 6/1927 | Crawford | 74/713 |
| 2,140,190 | 12/1938 | Riblet | 74/713 |
| 2,408,926 | 10/1946 | Griffith | 74/713 |
| 2,808,740 | 10/1957 | Boden | 74/713 |
| 2,818,129 | 12/1957 | Harnett | 74/713 X |
| 3,385,133 | 5/1968 | Terao | 74/713 X |
| 3,470,768 | 10/1969 | Ford et al. | 74/713 |
| 3,505,904 | 4/1970 | Williams, Jr. | 74/710 X |
| 3,690,399 | 9/1972 | Bokovoy et al. | 74/710 X |
| 3,779,102 | 12/1973 | Pfarrwaller | 74/713 |
| 3,905,089 | 9/1975 | Osenbaugh et al. | 74/713 X |

FOREIGN PATENT DOCUMENTS 460,030 10/1949 Canada ................................ 74/713

Primary Examiner—Samuel Scott
Assistant Examiner—Don E. Ferrell
Attorney, Agent, or Firm—Albert L. Jeffers

[57] ABSTRACT

A differential axle embodying a differential assembly mounted in a housing arrangement formed of, preferably, die cast aluminum parts and consisting of a central housing portion in which a differential is mounted and tubular portions connected to the sides thereof and extending laterally therefrom and within which the drive axles rotate. The differential unit forming a portion of the assembly consists of a differential carrier which is divided into two parts, with one part having the ring gear of the differential integral therewith and with each part of the differential carrier having hub portions which are heat treated and form the inner races of antifriction bearings which rotatably support the differential carrier within the centrl housing portions.

4 Claims, 2 Drawing Figures

DIFFERENTIAL AXLE

The present invention relates to improvements in differential axles.

Differential axle arrangements are widely known and are employed in connection with vehicles wherein it is desired to permit relative rotation of the driving wheels of the vehicle while still permitting the supply of motive power to both of the wheels. The usual differential unit, or differential axle, even for relatively light duty such as occurs in connection with golf carts, riding mowers, and the like, embodies expensive construction, utilizing tapered roller bearings and the like which require highly accurate machining of the several parts of the transmission and the use of shims at the time of assembly in order to obtain the proper fits, particularly in respect of the tapered bearings.

The result of constructing differential units, or axles, in the manner referred to, is greater expense of the unit and greater difficulty and expense in maintaining and repairing the unit.

With the foregoing in mind, the primary object of the present invention is the provision of a differential unit and axle housing combined therewith to form a differential axle which is relatively inexpensive to manufacture and which is relatively light in weight.

Another objective of the present invention is the provision of a differential axle arrangement in which the use of expensive tapered roller bearings and the like is eliminated without, however, in any way impairing the efficiency or life of the transmission.

A still further objective of the present invention is the provision of a differential axle arrangement which includes aluminum housing parts and steel parts rotating therein in which the steel parts are journalled on the aluminum parts through the interposition of needle bearings without, however, imposing a wearing load on the aluminum parts.

A still further objective is the provision of a differential unit having a two part carrier, in which the input ring gear forms an integral part of one of the carrier parts of the differential unit.

BRIEF SUMMARY OF THE INVENTION

According to the present invention, a differential axle assembly is provided having a housing comprising die cast aluminum parts within which the outer portions of the driven output shafts are rotatably mounted and with a central portion of the housing, also of die cast aluminum, forming a case within which a differential unit is mounted. The differential unit has output members connected to the respective output shafts and also has an input member which is driven by an input shaft which is also rotatably mounted in the case of the differential unit. The differential unit includes a two part carrier with one of the parts having an input gear, with which a pinion on the input shaft meshes, integral therewith and with both parts of the carrier being formed of steel or malleable iron, respectively, and each having a heat treated hub portion which forms a race on which needle bearings are mounted which fit into the aluminum central portion of the axle housing with the interposition of an outer support for the bearing rollers of the differential rotatably journalled on the aluminum axle housing without, however, imposing any wearing loads on the die cast aluminum.

Further, the needle bearings referred to are positioned so that they act as pilots for centering the tubular axle portions on the central portion of the housing.

The exact nature of the present invention and the several objects and advantages thereof will become more apparent upon reference to the following detailed description taken in connection with the accompanying drawings, in which.

DETAILED DESCRIPTION OF THE INVENTION

Figure 1:
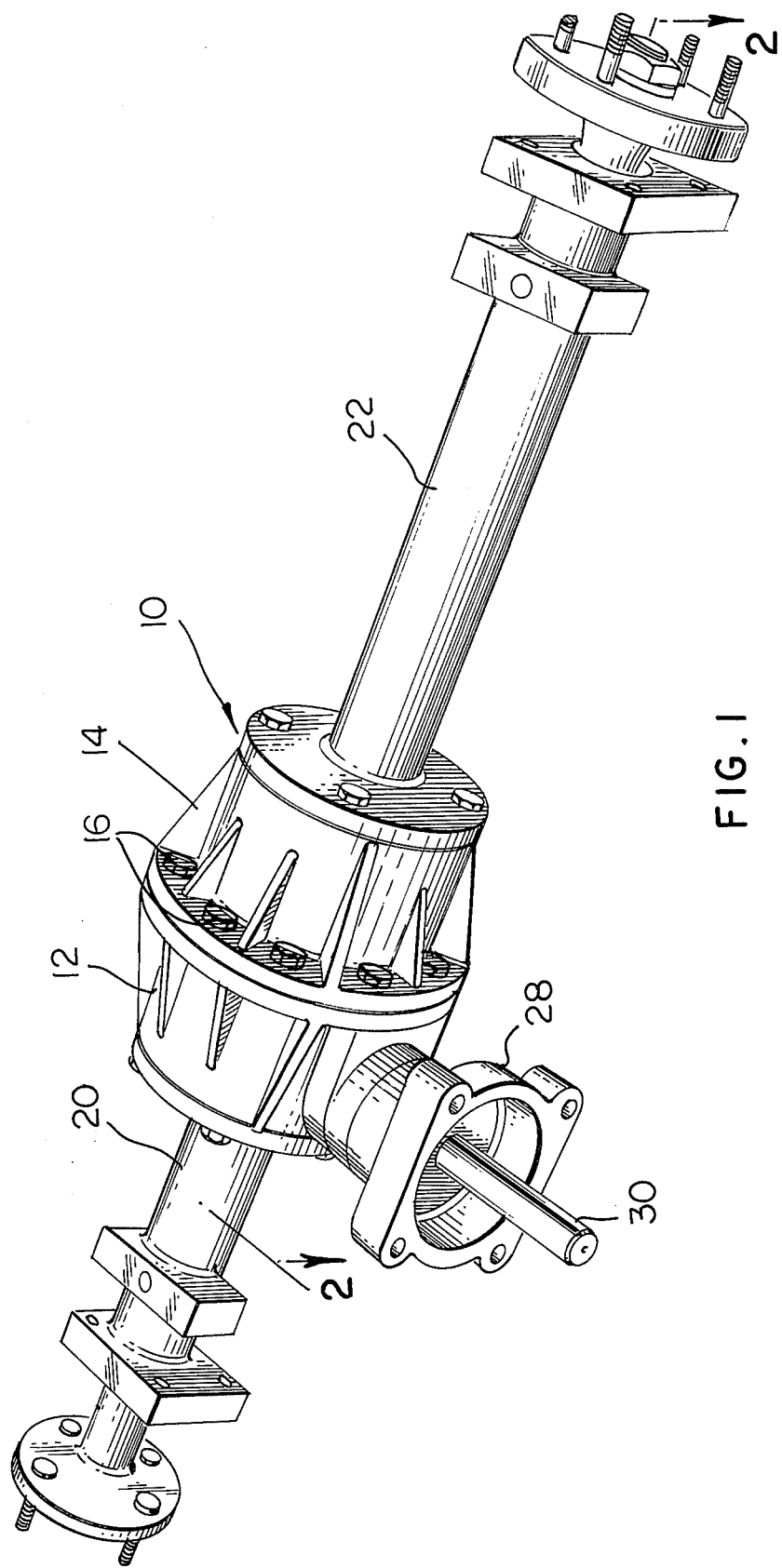
FIG. 1 is a perspective view showing a differential axle according to the present invention.
Figure 2:
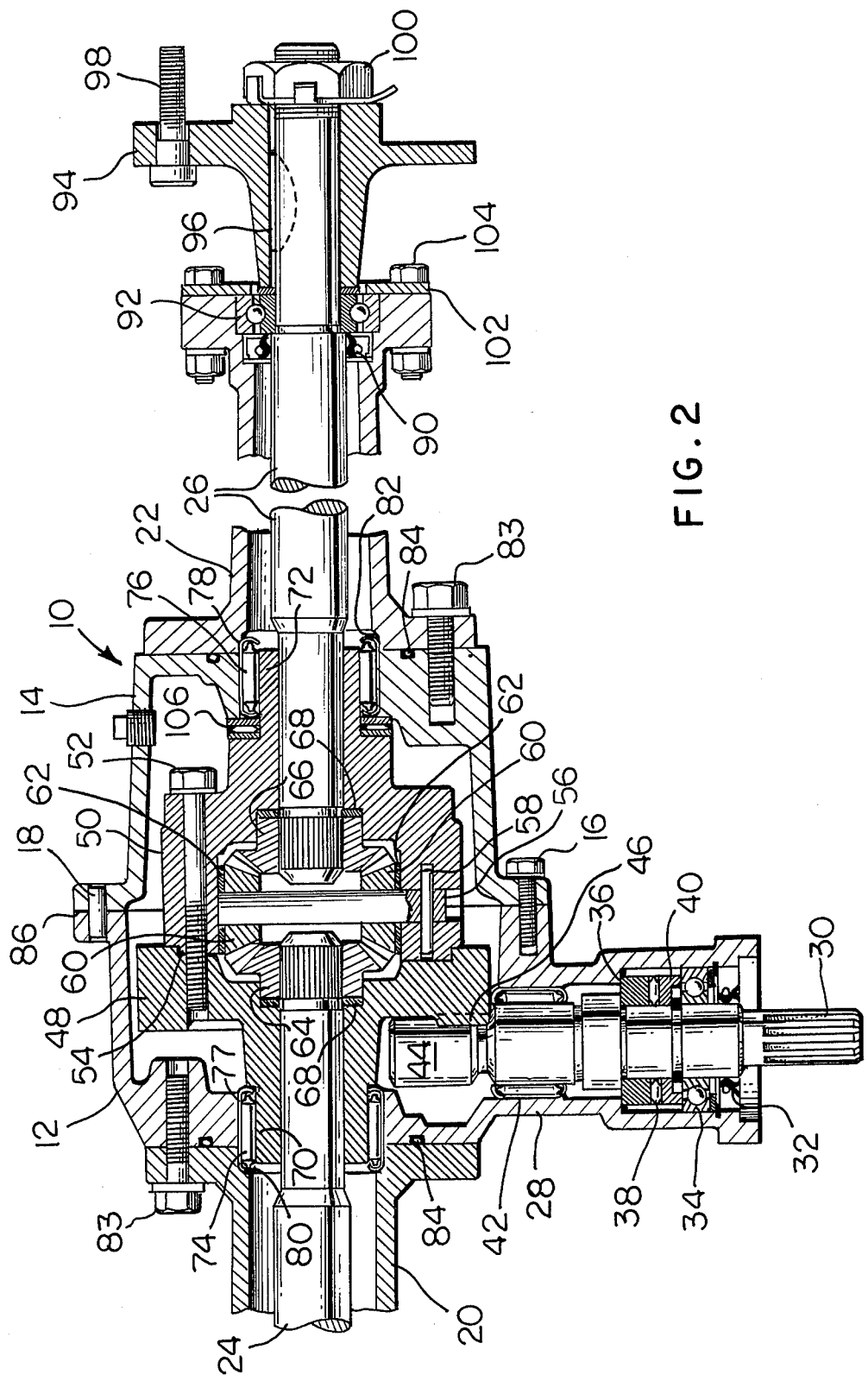
FIG. 2 is a plan sectional view, indicated by line 2—2 on FIG. 1, and partly broken away.

Referring to the drawings somewhat more in detail, the differential axle according to the present invention comprises a generally centrally located housing portion, generally indicated at 10, comprising the die cast aluminum parts 12 and 14 sealingly interconnected as by bolt means 16 and, preferably, precisely located relative to one another by dowel pins, one of which is indicated at 18 in FIG. 2.

The differential axle also comprises the lateral extending housing die cast aluminum portions 20 and 22 within which the driven axles 24 and 26, respectively, are rotatably mounted.

Part 12 of the central housing portion 10 has a portion 28 made of die cast aluminum protruding in the fore and aft direction and extending therein is input shaft 30 which, when driven, will drive output shafts 24 and 26. Shaft 30 may have a splined outer end, as shown, for connection with an electric motor shaft, or the end of shaft 30 may be configured to receive a pulley or sprocket, or gear, for use with an engine drive.

Referring to FIG. 2, it will be seen that shaft 30 which extends into portion 28 of the axle housing is sealed at the outer end by an oil seal 32, which includes an outer lip seal portion, and adjacent to oil seal 32 the shaft 30 is radially journalled in a ball bearing 34. Between ball bearing 34 and a shoulder 36 facing outwardly on the inside of portion 28 of the housing is a needle bearing having needles 38 and members 40 between which the needles 38 are disposed and which form the races for the bearing.

Further inwardly, another needle bearing 42 is provided for radial support of the shaft 30 and on the extreme inner end of the shaft a pinion 44 is formed integrally with the shaft.

Pinion 44 meshes with a geared portion 46 which is formed directly on a member 48 that forms one part of the two part carrier of the differential of the axle assembly. Member 48 is connected to another member 50 by bolts 52 and is precisely located relative to member 50 by the recess and pilot arrangement, indicated at 54.

Part 50 of the carrier of the differential has a shaft or pin 56 extending diametrally therethrough and held therein as by pin 58 extending through a hole in one end of pin or shaft 56. Pin or shaft 56 carries bevel gears 60 with washers 62 interposed between the hubs of the gears and member 50.

Gears 60 mesh with bevel gears 64 and 66 which are splined to the inner ends of axles 24 and 26, respectively, and with wear discs or washers 68 interposed between the hubs of gears 64 and 66 and the respective ones of members 48 and 50.

A feature of the present invention is to be found in the provision of the cylindrical hub portions 70 on member 48 and 72 on member 50. These hub portions are heat treated and smoothly finished and serve as the inner races for needle bearings 74 and 76, each of which has an outer race element 77, 78 integral therewith and closely fitting in a bore provided therefor in the respective one of housing portions 12, 14. The outer race elements 77, 78 prevent a wearing load from being imposed on the die cast aluminum housing parts 12 and 14.

Still further, the needle bearings and the respective outer race elements 77, 78 thereon are so constructed and arranged as to project outwardly beyond the limits of the respective housing portions 12, 14. The housing portions 20 and 22 are then provided with respective bores 80, 82 and to which the outer ends of the needle bearing carriers extend and closely fit so as to form pilots to locate the housing portions 20, 22 on the central portion of the axle assembly. The need for dowel pins at this point of the assembly is eliminated and, instead, ony clamp bolts 83 are required.

It will be apparent that any thrust exerted in the axial direction on shaft 30 will be absorbed by needle bearing 38, 40 and that any axial thrust imposed on the carrier of the transmission, consisting of parts 48 and 50, will be supported by a needle bearing 106 which, as will be seen in FIG. 2, is interposed between the outer side of part 50 and the respective portion 14 of the housing. Needle bearing 106 preferably has races associated therewith and suitable carrier means for carrying the needle bearings.

Sealing rings, such as the O rings at 84 are, of course, provided for sealing purposes and a gasket 86 can also be provided between parts 12 and 14 of the central portion 10.

Each of the axles 24 and 26 is, at the outer end, provided with a respective seal 90 and outwardly therefrom with a respective ball bearing 92, and outwardly beyond bearing 92 with a hub member 94 keyed to the respective shaft by a key 96 and having bolts 98 for receiving a wheel. Each hub is clamped in place on the respective axle by a nut 100. Each bearing 92 is held in place in a recess provided therefor in the outer end of the respective axle housing portion 20, 22 by a plate 102 which, in turn, is held in place as by nut and bolt means 104.

The case parts 12 and 14 and the axle housings 20 and 22 are all die cast aluminum resulting in a substantial weight reduction for energy savings.

Modifications may be made within the scope of the appended claims.

What is claimed is:

1. In a differential axle; a central die cast aluminum housing, a differential carrier unit rotatable on a predetermined axis in the housing, said differential unit comprising an input member and a pair of output members, said input member having wear resistant hub portions forming an inner bearing race and disposed on opposite sides thereof on said axis, said central housing having cylindrical bores on said axis within the axial range of said hubs, needle bearings disposed in said bores journalling said hubs therein, tubular portions connected to opposed sides of the central housing on said axis for supporting said output members at one end, said needle bearings including outer races which engage the peripheral walls of the bores and within which races the needles roll in direct contact with the wear resistant hub portions when said differential unit rotates, said needle bearing outer races projecting outwardly from said central housing into said tubular portions, said tubular portions having recesses for receiving said races with the races forming pilots to locate the tubular portions on the central housing.

2. In a differential axle; a central die cast aluminum housing, a differential carrier unit rotatable on a predetermined axis in the housing, said differential carrier unit including an input member and a pair of output members, said input members having wear resistant hub portions on opposite sides thereof on said axis, a pair of output shafts coupled respectively to the output members and exending therefrom through the hub portions along said axis, said central housing having cylindrical bores on said axis within the axial range of said hubs, needle bearings in said bores journalling said hubs therein, tubular portions connected to opposed sides of the central housing on said axis for receiving and supporting the output shafts to be driven by the output members, said needle bearings including outer races which engage the peripheral walls of the bores and within which races the needles roll in direct contact with the wear resistant hub portions serving as the inner race when said differential unit rotates, said needle bearing outer races projecting outwardly from said central housing into said tubular portions, said tubular portions having recesses for receiving said races with the races forming pilots to locate the tubular portions on the central housing.

3. In a differential axle; a central die cast aluminum housing, a differential carrier unit rotatable on a predetermined axis in the housing, said differential unit including an input member and a pair of output members, the input member and the central housing each being formed of parts separable generally along planes perpendicular to the said axis, said input member having wear resistant hub portions forming an inner race and disposed on opposite sides thereof on said axis, a pair of output shafts extending through the hub portions generally along said axis, said central housing having cylindrical bores on said axis within the axial range of said hubs, needle bearings in said bores journalling said hubs therein, tubular portions connected to opposed sides of the central housing on said axis for supporting the output shafts at one end to be driven by the output members, said needle bearings including outer races which engage the peripheral walls of the said bores and within which races the needles roll in direct contact with the wear resistant hub portion when said differential unit rotates, said needle bearing outer races projecting outwardly from said central housing into said tubular portions having recesses for receiving said races with the races forming pilots to locate the tubular portions on the central housing.

4. A differential axle according to claim 3 wherein each of said input member parts has a said hub portion thereon, one of said input member parts having an input ring gear integrally formed thereon on the side facing away from the other part of said input member, an input shaft extending into said central housing and journalled therein and having a pinion integrally formed on the inner end of the shaft and meshing with said ring gear, the other part of said input member having an annular shoulder coaxial with said axis and facing away from said ring gear, a thrust bearing between said shoulder and the opposed surface of the respective part of said central housing, the predetermined axis and the input shaft being generally coplanar with the plane thereof being generally perpendicular to the planes of separation of the input member and the central housing.

* * * * *